3 Sheets. Sheet 1.

A. B. Taylor.
Forming Bats.

No. 10,30. Reissued. Aug. 21. 1860.

Witnesses
Andrew DeLucy
Wm H. Bishop

A. B. Taylor

3 Sheets. Sheet 2.

A. B. Taylor,
Forming Bats.

No. 1030. Reissued. August 1860.

Witnesses
Andrew De Lacy
Wm H Burch

A. B. Taylor

A. B. Taylor.
3 Sheets. Sheet 3.
Forming Bats.
No. 1030.
Reissued Aug. 21. 1860.
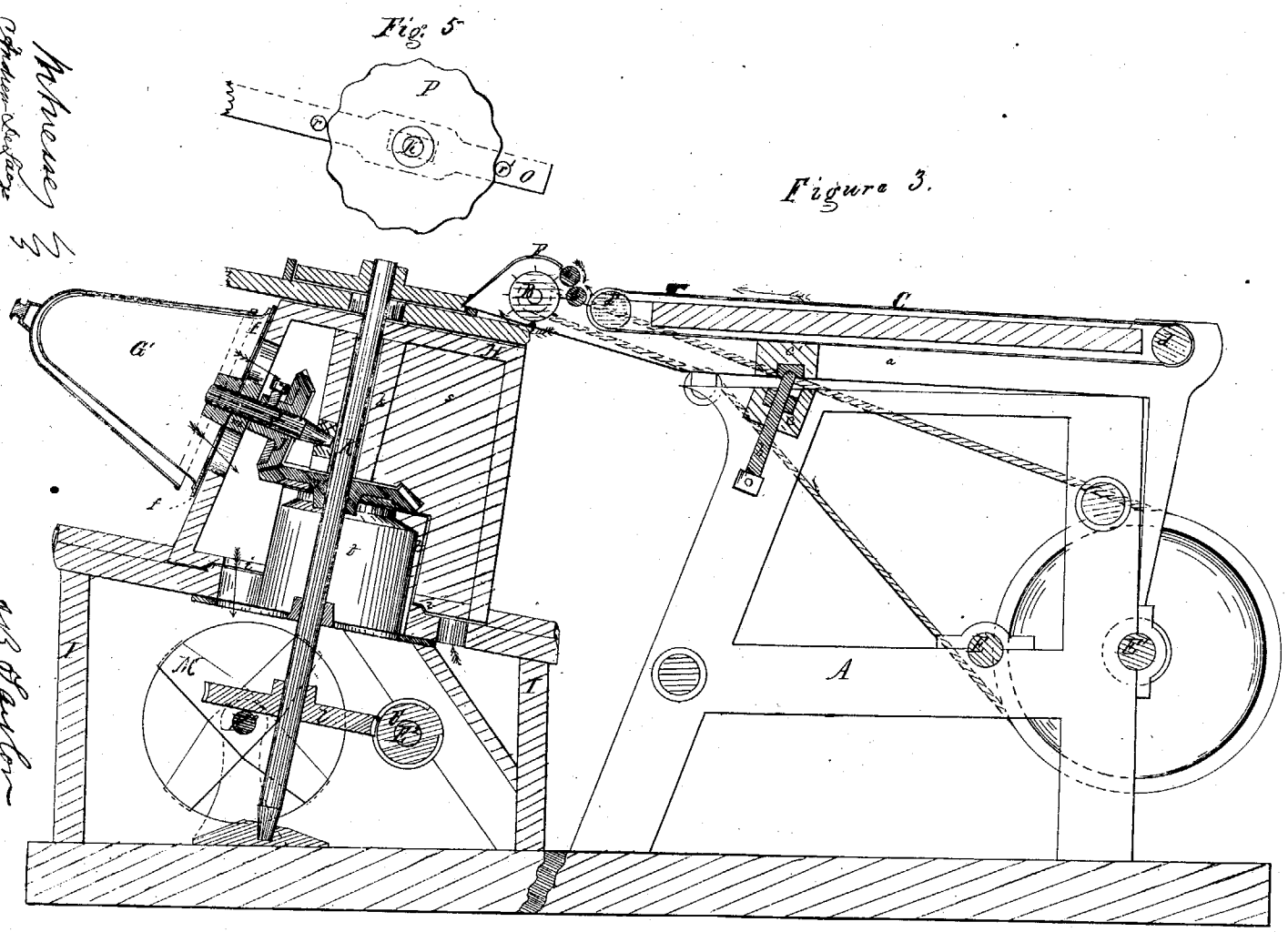
Witnesses
Andrew DeLange
Wm H Bishop
A. B. Taylor

UNITED STATES PATENT OFFICE.

ALVA B. TAYLOR, OF NEWARK, N. J., ASSIGNOR TO HENRY A. BURR, OF NEW YORK, N. Y.

IMPROVEMENT IN MACHINERY FOR MAKING HAT-BODIES.

Specification forming Letters Patent No. 14,476, dated March 18, 1856; Reissue No. 1,030, dated August 21, 1860.

*To all whom it may concern:*

Be it known that I, ALVA B. TAYLOR, of Newark, in the county of Essex and State of New Jersey, have invented certain new and useful Improvements in the Machinery and Process of Manufacturing Hat-Bodies; and I do hereby declare that the following is a full, clear, and exact description thereof, reference being had to the accompanying drawings, making part of this specification, in which—

Figure 1:
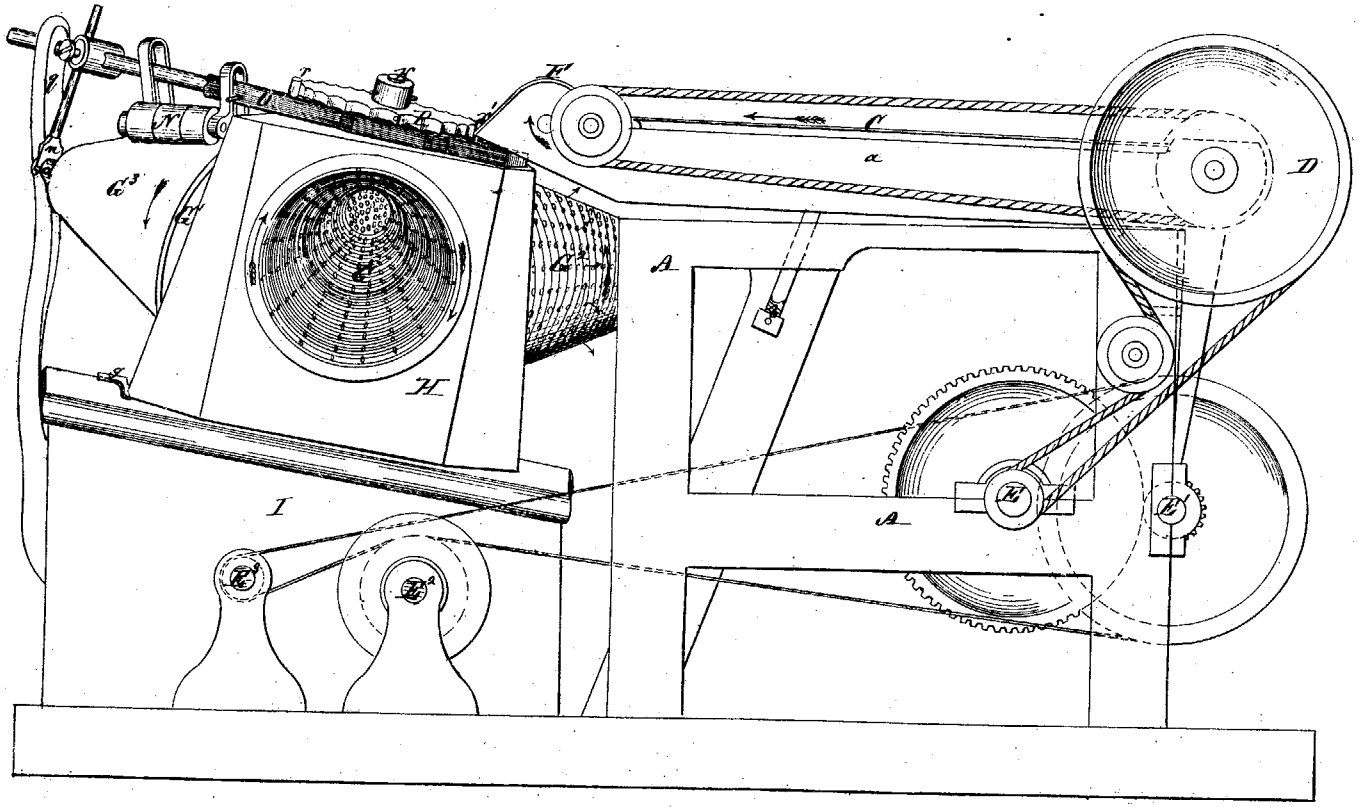
Figure 4:
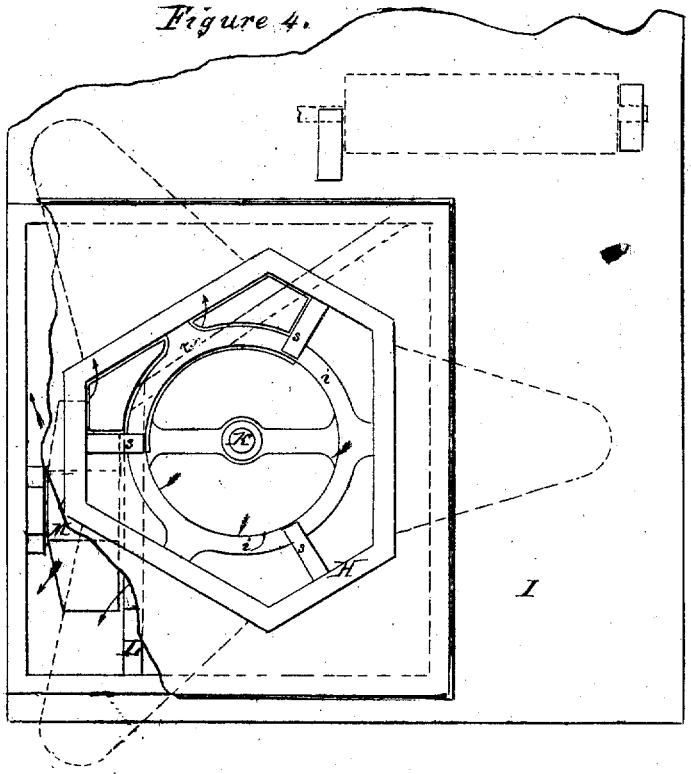
Figure 2:
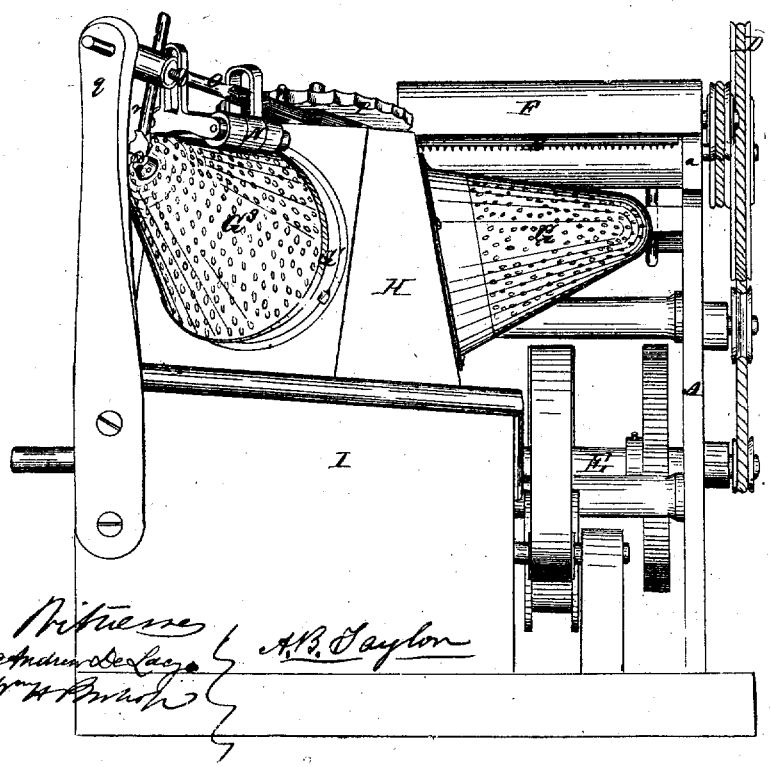

Figure 1 represents a side elevation of my improved hat-body machinery. Fig. 2 is an end elevation of the same. Fig. 3 is a vertical section thereof. Fig. 4 is a plan of the fan-case and draft-box, certain portions being removed to show the interior arrangement of the parts; and Fig. 5 is a plan of the scalloped-edged wheel and reciprocating bar.

Various machines have been constructed for manufacturing hat-bodies which operate upon the general plan of first disseminating the fur or other stock in a flocculent state in the air and directing it upon the surface of a perforated conical former, where it is collected, and there held by the pressure of the surrounding air, induced by exhausting the air from within the cone.

When flocculent fur has been collected upon a perforated cone in the form of a bat, it is necessary to harden it in order to permit it to be handled and fit it for the subsequent processes.

As the flocculent fibers in such methods of forming hat-bodies is only held on the pervious cone by the pressure of the surrounding air, it becomes necessary to cause the fibers to interlock, technically termed "hardening," before the bat can be safely removed from the pervious cone for the after process of sizing by felting; and it will be obvious that the process of hardening must either be performed while the pressure of the surrounding air is continued on the bat to hold the fibers together, or it must be enveloped by some means before the pressure of the surrounding air is suspended, and in such case the means employed for holding the fibers together on the cone must be such as will admit of the application of some suitable mode of hardening the bat.

My said invention, which relates to the hardening of the bat on the pervious cone on which it is formed, and while the fibers constituting the bat are held to the surface of the cone by the pressure of the surrounding air, consists in combining with a perforated cone on which the bat of fibers are held by the pressure of the surrounding air, a vibrating concave surface held by pressure so as to act on the convex surface of the bat as it is vibrated, by means of which combination a large segment of the bat along its entire length is acted upon at once by the concave surface, while by the rotation every part of the circumference is brought in succession under the hardening operation; and my said invention also consists in facilitating the removal of the bat from the pervious cone by so combining the pervious cone with the blower or any equivalent therefor that a blast of air can be forced into the cone and outward against the inside of the bat.

In the accompanying drawings, A is the frame of the picker, upon which the picking-cylinder and feed-motion are mounted and to which the shafts are secured, by means of which motion is imparted to various parts of the machine. The upper portion *a* of this picker-frame is made separate from the lower, and is attached to the latter by hinges or pivots, so that the end of the upper portion of the frame, at which the picking-cylinder B is situated, can be raised or depressed to adjust the position of the picking-cylinder to perforated cones of different dimensions. This adjustment of the upper portion of the picker-frame is effected by turning a screw, *b*, which passes through a nut, which is made fast to a cross-bar, *c*, of the lower portion of the picker-frame, and bears against the cross-bar *c'*, that connects together the sides of the upper portion of the picker-frame. The upper portion of the picker-frame is steadied and guided as it is raised or depressed by guide-pins which project downward from the upper cross-bar, *c*, through corresponding holes in the lower cross-bar, *c*. The feed-motion consists of an endless band or apron, C, which runs upon two rollers, *d d'*, situated near the opposite extremities of the upper portion, *a*, of the picker-frame. One of these rollers, *d*, has a pulley-wheel, D, secured to its axle to receive a belt, by which a rotary motion is imparted to the roller from the main shaft E at the lower part of the frame. The feed-apron conveys the stock to a pair of feed-rollers, *e e*, which are situated immediately in front of the picking-cylinder B. Motion is imparted to the lower of these feed-rollers from the shaft of the feed-apron roller D by means of a belt which encircles a belt-pulley secured to the shaft and a corresponding one upon the axle of the feed-roller. The upper roller is driven from the lower by means of a pair of pinions whose teeth engage, and which are secured to the axles of the respective feed-rollers. In order that the feed-rollers may grip the fur more securely the upper one should be pressed toward the lower by springs or weights, and the barrels of the two rollers should be slightly fluted.

The picking-cylinder B, which revolves in close proximity with the feed-rollers, has its barrel studded with teeth, which act upon the fur presented to them by the rollers. It should be driven at a high speed, and in the machine represented in the accompanying drawings motion is imparted to it from the counter-shaft E′ by means of a belt, which encircles a suitable belt-pulley secured to the shaft, and a corresponding belt-pulley upon the shaft of the picking-cylinder. The counter-shaft E′ is driven from the main shaft by means of cog-wheels secured to the respective shafts. The picking-cylinder revolves in the direction indicated by the arrow placed beneath it in Fig. 3, and it is covered with a cap or case, F, which extends its whole length, and acts as a deflecting-plate to cause the fur, which naturally tends to adhere to the picking-cylinder, to pass off from the latter in the direction indicated by the red arrow in Fig. 1. It also prevents the stock from the feed-apron from passing accidentally over the upper feed-roller.

The perforated cone G, which receives the fur from the picking-cylinder, forms one of a series of three, G $G^1$ $G^2$, which project radially from a pyramidal draft-box H. The draft-box is supported by a fan case, I, which is sufficiently large to form a firm base for the draft-box, as well as to contain the fan by which the draft is maintained through the perforations of the cones. The draft-box has a collar-plate, *i*, at its bottom, which fits loosely upon a corresponding collar on the top of the fan-case I, beneath the draft-box, in such manner that the draft-box with the cones upon it can be turned upon its axis to bring each cone in turn in the proper position to receive the flocculent fur from the picking-cylinder. In order to hold the draft-box, with the cones upon it, stationary until the proper quantity of fur is collected upon the cone opposite the picker, one of its corners is engaged with a spring-catch, *g*, which is secured to the top of the fan-case. The circular space within the collar-plates is open so as to permit a free draft from the interior of the draft-box to the fan-case beneath. A circular opening is also made in each face of the draft-box behind the base of each perforated cone, so as to permit the draft to be drawn through the cone into the draft-box.

Each perforated cone is made fast by a rim at its base to a ring-plate, *f*, whose face is sufficiently broad to receive perforated cones of the various sizes used in the manufacture of hat-bodies, and the ring-plate is secured to a short shaft, *j*, that projects radially outward from the axis of the draft box. The inner journal of each of these radiating shafts is supported in a hub, *k*, at the center of the draft-box, and the outer journal of each shaft is supported by a bridge-tree, *m*, which crosses the opening in the face of the draft-box. The radiating shafts are fitted with radiating wheels, J, whose teeth engage with a corresponding beveled wheel, J′, that is secured to an upright shaft, K, passing through the hub of the draft-box. This upright shaft extends upward sufficiently to pass through and project a short distance beyond the top of the draft-box. It also extends downward into the fan case beneath, where it is fitted with a worm-wheel, *l*, to which motion is imparted by a worm, *l′*, upon a horizontal shaft, $E^2$.

The fan M, by which the draft is maintained, is of the screw variety. It is situated at the mouth of a circular opening in a partition, L, which crosses the fan-case and divides it into two parts, the larger of which communicates by the opening in the collar-plates with the draft-box above, while the smaller communicates with an air-trunk situated beneath the floor of the factory, so that the air drawn from the perforated cones through the draft-box and larger compartment of the fan-case is discharged into the smaller compartment, from which it escapes through the air-trunk. The fan-shaft $E^3$ is fitted with a belt-pulley, and is driven from the counter-shaft E of the picker-frame by means of a belt which passes over a pulley upon the worm-shaft $E^2$ and drives the latter.

The axis of the draft-box is inclined, in order that when the draft-box is turned upon the collar-plates the perforated cones may readily pass beneath the picking cylinder. The draft-box is also set close to the picker-frame, so that the perforated cone upon which the fur from the picker is received is separated by no greater space from the latter than is necessary to permit the perforated cones to pass the picker-frame when the draft-box is turned. The inclination of the axis of the draft requires a corresponding inclination in the upright shaft K, which is sufficient to permit the teeth of the worm-wheel to work freely without requiring them to be skewed.

As has been stated, there are three perforated cones, G G′ $G^2$, upon the draft-box. One of these, G, Figs. 1 and 2, is in the proper position to receive the fur delivered by the picking cylinder, being opposite thereto and extending lengthwise therewith, that portion of the conical surface which is nearest to the picking-cylinder being slightly oblique thereto, as shown in the accompanying drawings. This position of the cone with reference to the picker is attained by setting the radiating shaft *j* at a suitable inclination to the upright shaft K, and the draft-box is made of pyramidal form in order to accommodate its sides to the position of the base of the cone. Of the other two cones, one, G, is in a proper position for the hardening of the coating of fur or bat which has collected upon it. This hardening is effected by the combined action of pressure and motion. The pressure is imparted by the surrounding air and by means of a conical cover, $G^3$, which lies loosely upon the bat, upon which cover a series of weighted rollers, N, rest. A rapid reciprocating movement is imparted to the cover by means of a bar, *o*, which slides radially to and fro across the top of the draft-box. The outer extremity of this reciprocating bar is fitted with an arm, *n*, that projects downward, and is received in a ring-groove which is formed in a boss, *o*, secured to the head of the cover. The inner half of the reciprocating bar has two pins, *r r'*, protruding from its upper face, which are acted upon alternately by the scalloped rim of a wheel, P, that is secured to the upper end of the upright shaft K. The reciprocating bar is prevented from turning with the scalloped wheel P by a guide-standard, *q*, in which the outer end of the reciprocating bar slides, while its inner extremity is maintained in its proper position by the upright shaft K, which passes through a slot in the bar; hence, as the upright shaft and the scalloped wheel upon it revolve, a short and rapid or tremulous reciprocating movement is imparted to the reciprocating bar *o*, and from it, by means of the arm *n* at its outer end, to the cover $G^3$, that is borne upon the bat by the weight of the rollers N.

In order that the hardened bat may be readily removed from the perforated cone a blast of air is forced through the cone onto the interior of the bat. The blast of air is obtained from the fan in the fan case beneath in the following manner: The interior of the draft-box is divided by three radial partitions, *s s s*, which extend inward to the central hub, *k*, into three divisions, one of which corresponds with each perforated cone. That portion of each radial partition which is above the circular opening in the collar-plates *i* and below the central hub, *k*, is cut away so as to leave the cylindrical space above the circular opening in the collar-plates unobstructed. A curved partition, *t*, projects upward into this cylindrical space from the fan-case beneath. This curved partition is so secured by its lower edge to the collar-plate upon the fan-case, and it is of such height and breadth, that it closes the space between two of the radial partitions *s s* and shuts off one division of the draft-box and the perforated cone communicating therewith from the remaining two, so that the draft passing to the fan-case cannot be drawn through the perforated cone whose base is adjacent to the curved partition. That portion of the top of the fan-case which is immediately beneath the division of the draft-box from which the draft is shut off is cut away, so as to form a communication between the division of the draft-box and the smaller compartment of the fan-case, into which the fan discharges air; hence a portion of the air forced by the fan into the smaller compartment of the fan-case, and intending to escape therefrom, finds its way upward into the cone, and, passing through the perforations thereof, presses upon the interior of the hat-body and assists its disengagement from the cone.

The various parts of the machinery thus described are caused to move by imparting a rotary motion to the main shaft E from the prime mover of the manufactory.

When the machine is in operation, the feed-apron, feed-rolls, picking cylinder, and perforated cones move in the directions respectively indicated by the arrows in the drawings. A weighed quantity of fur or other suitable stock sufficient to form one hat-body is laid by the attendant upon the feed-apron and is conveyed by it to the feed-rollers, which present it to the picking-cylinder. The latter in its rapid revolution picks the fur and carries it round with it until it is deflected by the casing of the picking-cylinder. When the fur leaves the cylinder, it is drawn toward the perforated cone immediately opposite. As this cone slowly revolves the flocculent fur collects upon it until the charge upon the feed-apron is exhausted. At this point of the operation the attendant stops the feed-apron, upon which he has meanwhile been distributing a second charge, which is separated by a short vacant space from the first one. As soon as the whole of the fur is collected upon the perforated cone an attendant applies a cover to the bat and then turns the draft-box one third round; or he can turn it one-third round and then apply the cover, the fibers of the bat being held to the surface of the cone by the pressure of the air, which is continued to be induced by exhausting the air from the inside of the cone. This movement brings a second cone in the proper position to receive fur from the picker, while the first one with the bat and cover upon it is brought to the hardening apparatus, where the pressure applied by the cover, combined with the tremulous movement imparted to it, induces a rapid felting of the fibers of fur and the consequent hardening of the bat. This operation proceeds so quickly that by the time the second cone has received a charge of fur upon it from the picking-cylinder the bat upon the first one is sufficiently hardened to bear handling without injury. The draft-box is now turned a second third of a revolution, by which movement the third cone is presented to the picking cylinder, the second passes to the hardening apparatus, and the first, with its hardened bat, is freed from the hardening apparatus, and is in the proper position for the removal of the bat.

This operation is effected by shaking the cover by hand, when the pressure of the air within the cone detaches the hardened bat so that it may readily be withdrawn with the cover, leaving the perforated cone free and ready to be again presented to the picking-cylinder. After the hardened bat or hat-body is removed from the machine the hardening process may be carried to a greater extent by wrapping the bat in a damp linen cloth and working it by hand in the same manner that bats are worked in the manufacture of hat-bodies by hand. The dimensions of the cover $G^3$ with respect to the bat are not important, provided that it may be large enough to pass easily over it, as the object of the cover is not to confine the fur, but to impart pressure and friction to it. If the cover be of nearly the same size as the bat it should be perforated, to permit the air to press upon the bat; but if the cover be larger in diameter than the bat it is not necessary that it should be perforated, as there will then be sufficient space for air to pass inside of the cover.

In the manufacture of hats it is customary to form the top or tip of the hat body thinner than the rest, while those parts which are to form the brim of the hat and to receive the hat-band should be thicker than the rest. In order to accomplish this result the fur must be unequally distributed over the perforated cone, a larger quantity being delivered to those parts where the hat-body is to be thickest. I effect the requisite distribution of the fur for this purpose by varying the feed to the different portions of the picking-cylinder.

From the foregoing it will be seen that the outer cover, by reason of the form of the inner surface, is made to act at any one time upon the entire length of the bat, from the base or rim to the center of the tip and over a considerable portion of its circumference, so that the triturating action to effect the hardening can be applied with entire safety to the structure of the bat, while the fibers of which it is composed are held to the surface of the pervious cone by the pressure of the surrounding air.

It will be evident to the skillful mechanic that various changes may be made in the machinery described by me without materially affecting the principle of my invention, and I reserve to myself the right to make such changes as circumstances may require.

What I claim as my invention is—

1. The combinatiom of a vibrating concave surface, substantially as described, with an exhausted pervious cone on which the bat of flocculent fibers is held by the pressure of the surrounding air, substantially as and for the purpose specified.

2. Facilitating the removal of the bat from the pervious cone on which it is formed by means of a blast of air forced into the cone, substantially as specified.

ALVA B. TAYLOR.

Witnesses:

WM. H. BISHOP,

DANIEL BARNUM.